United States Patent
Nagatomo

(10) Patent No.: US 9,905,227 B2
(45) Date of Patent: *Feb. 27, 2018

(54) SPEECH RECOGNITION SYSTEM, REQUEST DEVICE, METHOD, PROGRAM, AND RECORDING MEDIUM, USING A MAPPING ON PHONEMES TO DISABLE PERCEPTION OF SELECTED CONTENT

(71) Applicant: NEC CORPORATION, Tokyo (JP)

(72) Inventor: Kentaro Nagatomo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/241,233

(22) Filed: Aug. 19, 2016

(65) Prior Publication Data

US 2016/0358608 A1 Dec. 8, 2016

Related U.S. Application Data

(60) Continuation of application No. 14/064,976, filed on Oct. 28, 2013, now Pat. No. 9,520,129, which is a (Continued)

(30) Foreign Application Priority Data

Oct. 28, 2009 (JP) .................... 2009-247874

(51) Int. Cl.
*G10L 15/00* (2013.01)
*G10L 21/00* (2013.01)
(Continued)

(52) U.S. Cl.
CPC ............ *G10L 15/22* (2013.01); *G10L 15/02* (2013.01); *G10L 15/187* (2013.01);
(Continued)

(58) Field of Classification Search
CPC ...... G10L 15/22; G10L 15/265; G10L 17/005; G06Q 20/425; G06F 21/32
(Continued)

(56) References Cited

U.S. PATENT DOCUMENTS

| 5,893,057 | A | 4/1999 | Fujimoto et al. |
| 6,292,782 | B1* | 9/2001 | Weideman ........... G06Q 20/425 704/273 |

(Continued)

FOREIGN PATENT DOCUMENTS

| JP | 9-120293 A | 5/1997 |
| JP | 2003-5949 A | 1/2003 |

(Continued)

OTHER PUBLICATIONS

Communication dated May 7, 2015, issued by the United States Patent and Trademark Office in corresponding U.S. Appl. No. 13/504,264.

(Continued)

*Primary Examiner* — Farzad Kazeminezhad
(74) *Attorney, Agent, or Firm* — Sughrue Mion, PLLC

(57) ABSTRACT

Provided is a speech recognition system, including: a first information processing device including a speech recognition processing unit for receiving data to be used for speech recognition transmitted via a network, carrying out speech recognition processing, and returning resultant data; and a second information processing device connected to the first information processing device via the network. The second information processing device performs conversion of the data into data having a format that disables a content thereof from being perceived by application of a mapping function on phoneme ID's associated with the content, and also enables the speech recognition processing unit to perform the speech recognition processing. Thereafter, the second (Continued)

information processing device transmits the data to be used for the speech recognition by the speech recognition processing unit and constructs resultant data returned from the first information processing device into a content of a valid and perceivable recognition result.

4 Claims, 8 Drawing Sheets

Related U.S. Application Data division of application No. 13/504,264, filed as application No. PCT/JP2010/068230 on Oct. 12, 2010, now abandoned.

(51) Int. Cl.
| | |
|---|---|
| *G10L 25/00* | (2013.01) |
| *G10L 15/22* | (2006.01) |
| *G10L 15/26* | (2006.01) |
| *G10L 15/30* | (2013.01) |
| *G10L 15/02* | (2006.01) |
| *G10L 15/187* | (2013.01) |
| *G10L 17/00* | (2013.01) |
| *G06F 21/32* | (2013.01) |

(52) U.S. Cl.
CPC ............ *G10L 15/265* (2013.01); *G10L 15/30* (2013.01); *G06F 21/32* (2013.01); *G10L 17/005* (2013.01); *G10L 2015/025* (2013.01)

(58) Field of Classification Search
USPC ........................................................ 704/273
See application file for complete search history.

(56) References Cited

U.S. PATENT DOCUMENTS

| | | |
|---|---|---|
| 2002/0107918 A1 | 8/2002 | Shaffer et al. |
| 2004/0010409 A1 | 1/2004 | Ushida et al. |
| 2004/0243414 A1 | 12/2004 | Yamada et al. |
| 2005/0102142 A1 | 5/2005 | Soufflet et al. |
| 2006/0009980 A1 | 1/2006 | Burke et al. |
| 2009/0299743 A1 | 12/2009 | Rogers |

FOREIGN PATENT DOCUMENTS

| | | |
|---|---|---|
| JP | 2004-530149 A | 9/2004 |
| JP | 2005-514682 A | 5/2005 |
| JP | 2005-331616 A | 12/2005 |
| JP | 2006-309356 A | 11/2006 |

OTHER PUBLICATIONS

Communication dated Oct. 9, 2015 from the United States Patent and Trademark Office issued in corresponding U.S. Appl. No. 13/504,264.

International Search Report for PCT/JP2010/068230 dated Dec. 21, 2010.

Tatsuya Kawahara et al., "Free Software Toolkit for Japanese Large Vocabulary Continuous Speech Recognition", Int'l Conf. on Spoken Language Processing (ICLSP), pp. 476-476, vol. 4, 2000.

* cited by examiner

SPEECH RECOGNITION SYSTEM, REQUEST DEVICE, METHOD, PROGRAM, AND RECORDING MEDIUM, USING A MAPPING ON PHONEMES TO DISABLE PERCEPTION OF SELECTED CONTENT

CROSS REFERENCE TO RELATED APPLICATIONS

This application is a continuation of U.S. patent application Ser. No. 14/064,976, filed on Oct. 28, 2013, which is a divisional of U.S. patent application Ser. No. 13/504,264, filed on Apr. 26, 2012, which is a national stage of International Application No. PCT/JP2010/068230, filed on Oct. 12, 2010, which claims priority from Japanese Patent Application No. 2009-247874, filed on Oct. 28, 2009, the contents of all of which are incorporated herein by reference in their entirety.

TECHNICAL FIELD

This invention relates to a speech recognition system, a speech recognition method, and a speech recognition program. Specifically, this invention relates to a speech recognition system, a speech recognition method, and a speech recognition program, which disable the third party from restoring details of a recognition result regarding a content of speech to be subjected to speech recognition, details of a speech recognition dictionary, or the like.

BACKGROUND ART

A speech recognition technology using an information processing system is a technology for taking out language information included in input speech data. A system using the speech recognition technology can be used as a speech word processor if all the speech data are converted into text, and can be used as a speech command input device if a keyword included in the speech data is extracted.

FIG. 7 illustrates an example of a related speech recognition system. The speech recognition system illustrated in FIG. 7 includes an utterance segment extraction unit, a feature vector extraction unit, an acoustic likelihood computation unit, a hypothesis search unit, and a database for speech recognition.

The speech recognition system including such components operates as follows.

A segment that involves actual utterance (speech segment) and a segment that does not (silent segment) coexist in a sound (speech) input to the speech recognition system, and hence the utterance segment extraction unit is used to take out only the speech segment therefrom.

Subsequently, the speech data within the extracted segment is input to the feature vector extraction unit, and a feature vector is extracted by taking out various features included in the speech at regular time intervals (frames). The features that are often used may be, for example, cepstrum, power, and Δ power. A combination of a plurality of features is handled as a sequence (vector) and may be referred to as "feature vector".

The extracted feature vector of the speech is sent to the acoustic likelihood computation unit to obtain likelihood (acoustic likelihood) thereof with respect to each of a plurality of phonemes that are given in advance. Often used as the acoustic likelihood is a similarity to a model of each of phonemes recorded in an acoustic model of the database. The similarity is generally expressed as a "distance" (magnitude of deviation) from the model, and hence "acoustic likelihood computation" is referred to also as "distance calculation". The phonemes are obtained intuitively by dividing a phonetic unit into a consonant and a vowel, but even the same phoneme exhibits different acoustic features when the preceding phoneme or the following phoneme differs. It is therefore known that such cases are separately modeled to increase precision in the recognition. The phonemes obtained by thus taking the phonemes before and after a phoneme into consideration are referred to as "triphone (trio of phonemes)". The acoustic model widely used today expresses state transitions among the phonemes by a Hidden Markov Model (HMM). Accordingly, the acoustic model represents a set of HMMs on a triphone-to-triphone basis. In most implementations, each triphone is assigned an ID (hereinafter, referred to as "phoneme ID"), and is handled wholly by the phoneme ID in processing in the subsequent stages.

The hypothesis search unit references a language model regarding the acoustic likelihood obtained by the acoustic likelihood computation unit to make a search for a word string having the highest likelihood. The language model may be considered by being classified into a dictionary and a strict language model. In this case, the dictionary is given a list of vocabulary that can be handled by the (broad-sense) language model. In general, each word entry within the dictionary is assigned a phoneme string (phoneme ID string) of a corresponding word and a representation character string thereof. Meanwhile, the strict language model includes information obtained by modeling the likelihood (language likelihood) that a given word group within the vocabulary continuously appears in a given order. Grammar and N-gram are most often used as the strict language model today. The grammar represents direct descriptions of adequacy of given word concatenations that are made by using words, attributes of words, categories to which words belong, and the like. Meanwhile, the N-gram is obtained by statistically computing an appearance likelihood of each word concatenation formed of N words based on an actual appearance frequency within a large volume of corpus (text data for learning). In general, each entry of the dictionary is assigned an ID (hereinafter, referred to as "word ID"), and the (strict) language model serves as a function that returns a language likelihood when a word ID string is input thereto. In summary, search processing performed by the hypothesis search unit is processing for obtaining the likelihood (acoustic likelihood) of phonemes from a feature vector string, obtaining whether or not to allow conversion into the word ID from the phoneme ID string, obtaining the appearance likelihood (language likelihood) of the word string from the word ID string, and finally finding the word string having the highest likelihood.

A typical example of those kinds of speech recognition systems includes that described by T. Kawahara, A. Lee, T. Kobayashi, K. Takeda, N. Minematsu, S. Sagayama, K. Itou, A. Ito, M. Yamamoto, A. Yamada, T. Utsuro, and K. Shikano in "Free software toolkit for Japanese large vocabulary continuous speech recognition." In Proc. Int'l Conf. on Spoken Language Processing (ICLSP), Vol. 4, pp. 476-479, 2000 (Non Patent Literature 1).

Note that, there are limitations on the vocabulary and phrases that can be modeled by a single language model. If a larger volume of vocabulary and diverse phrases are to be modeled beyond the limitations, ambiguity in hypothesis search increases, which results in a decrease in recognition speed and a deterioration in recognition precision. Further, it is impossible to collect all an enormous amount of vocabulary in the first place. Accordingly, in a normal case, it is general to customize the language model depending on a task or domain for which the speech recognition technology is to be made use of. For example, to use the speech recognition technology for speech command, a language model formed of only commands that can be received is created. Alternatively, if the speech recognition technology is used to support dictation from minutes of recorded speech in a meeting, a language model is constructed by modeling only words and phrases that appeared in the written minutes of the meeting held in the past and the speech in the meeting along with their related words and phrases. This enables the vocabulary specific to a particular task or domain to be collected and enables appearance patterns thereof to be modeled.

Further, the acoustic model is generally obtained by putting a machine learning technology to full use by use of a large amount of labeled speech data (set of speech data to which information as to which segment of the speech data corresponds to which phoneme is given). In general, such speech data, collection of which requires high cost, is not customized for each user and is prepared individually so as to suit general properties of expected use scenes. For example, the acoustic model learned from labeled data of telephone speech is used for telephone speech recognition. There is sometimes provided an optimization processing function (referred to generally as "speaker learning" function or "enrollment" function) suitable for the speech of the individual users, which is a function of learning difference information between the acoustic model shared by users and the speech of the user, but a basic acoustic model itself is rarely constructed for each user.

The speech recognition is widely applicable to various purposes, but poses a problem of requiring corresponding calculation amount particularly in the above-mentioned hypothesis search processing. The speech recognition technology has been developed by solving mutually contradictory objects to increase the recognition precision and to reduce the calculation amount, but even today, there still remains a problem, for example, that there are limitations on a vocabulary number that can be handled by a cellular telephone terminal and the like. In order to realize the speech recognition which is high in the degree of freedom with a high precision, it is more effective to execute speech recognition processing on a remote server that can process an abundant amount of calculation. For such reasons, in recent years, such an implementation form (client-server speech recognition form) as to execute the speech recognition processing on the remote server and receive only a recognition result (or some action based on the result) on a local terminal is under active development.

Japanese Unexamined Patent Application Publication (JP-A) No. 2003-5949 (Patent Document 1) discloses an example of the speech recognition system having the implementation form described above. As illustrated in FIG. 8, a speech recognition system disclosed in Patent Document 1 includes a client terminal and a server that communicate with each other via a network. The client terminal includes a speech detection unit (utterance extraction unit) for detecting a speech segment from an input speech, a waveform compression unit for compressing the speech data of the detected segment, and a waveform transmission unit for transmitting compressed waveform data to the server. Further, the server includes a waveform reception unit for receiving the compressed waveform data transmitted from the client terminal, a waveform decompression unit for decompressing the received compressed speech, and an analysis unit and a recognition unit for analyzing the decompressed waveform and subjecting the waveform to the speech recognition processing.

The speech recognition system of Patent Document 1 including such components operates as follows. That is, a sound (speech) taken in the client terminal is divided into a speech segment and a non-speech segment by the speech detection unit. Of those, the speech segment is compressed by the waveform compression unit and then transmitted to the server by the waveform transmission unit. The waveform reception unit of the server, which has received this, sends the received data to the waveform decompression unit. The server causes the analysis unit to extract a feature from the waveform data decompressed by the waveform decompression unit, and finally causes the recognition unit to execute speech recognition processing.

Also in a client-server speech recognition technology, an operation itself of a speech recognition unit has essentially the same operation itself as that operating on a single host. In the invention disclosed in Patent Document 1, the processing up to the step of FIG. 7 performed by the utterance extraction unit is executed by the client terminal, and the subsequent steps are executed by the server. In addition thereto, there exists a client-server speech recognition technology in which the processing up to the step corresponding to the feature vector extraction unit is performed on the client terminal.

The client-server speech recognition technology has been developed mainly by assuming the use on mobile terminals (such as cellular telephones, PDAs, PHSs, and netbooks). As described above, an original object thereof is to overcome the problem that the speech recognition is difficult to perform on the mobile terminals having poor processing performance because the calculation amount involved in the speech recognition processing is severe. In recent years, the processing performance of the mobile terminals has improved, while the speech recognition technology has been sophisticated, and hence a client-server speech recognition system is not always necessary. On the other hand, the client-server speech recognition system is drawing much more attention. This is based on a trend (so-called software as a service (SaaS)) wherein various functions heretofore realized in the local terminal are now provided over the network in consideration of an increase of a network bandwidth, management costs, and the like. In a case where the speech recognition technology is provided as a network service, a system therefore is constructed on the basis of the client-server speech recognition technology.

DISCLOSURE OF THE INVENTION

Problems to be Solved by the Invention

Next, description would be made about future problems concerned with a speech recognition system.

A first problem is that a risk that a content of a user's utterance (speech signal) may be leaked to the third party increases in a case where a speech recognition function is realized as a service provided via a network. This is because even if secrets of communications are protected by encrypting speech data on a communication channel, the speech data may be decoded at least on a speech recognition server that provides a speech recognition service.

A second problem is that a risk that a content expected to be uttered by the user or special information related to a task or domain to be used for a speech recognition technology by the user may be leaked to the third party increases in the case where the speech recognition function is realized as the service provided via the network. This is because more or less customization is necessary for a language model in order to perform the speech recognition with a practical accuracy. Specifically, such customization may need to add, to the language model, a vocabulary that expresses the special information related to the task or domain. This is also because the language model is essential in a hypothesis search stage within speech recognition processing, and hence the language model is put into a readable state at least on the recognition server in a system that performs hypothesis search processing on a recognition server.

Note that, the third party referred to herein includes one (natural person, artificial person, and other system) that provides the speech recognition service. If the leak only to a speech recognition service provider is no problem, the communication channel and a language model file may be simply encrypted. However, in a case of wishing to make information secret even from the speech recognition service provider, the above-mentioned technology cannot handle the case. Further, other examples of the third party include a hacker or cracker that illegally breaks into a server, and a system (program) that performs such an act. This means that in the case where the server that provides the speech recognition service has been broken into, the speech data, analysis results, the special information related to the task or domain, and the like may be acquired with ease by the third party and no countermeasures can be taken by service users at all.

This invention provides a speech recognition system capable of secret speech recognition which suppresses a risk that a content of a user's utterance may be leaked to the third party to a minimum level in a case where a speech recognition function is realized as a service provided via a network.

Further, this invention provides a speech recognition system capable of secret speech recognition which suppresses a risk that a content expected to be uttered by the user or special information related to a task or domain to be used for a speech recognition technology by the user may be leaked to the third party to a minimum level in a case where the speech recognition function is realized as the service provided via the network.

Means to Solve the Problems

A speech recognition system according to this invention includes: a first information processing device including a speech recognition processing unit for receiving data to be used for speech recognition transmitted via a network, carrying out speech recognition processing, and returning resultant data; and a second information processing device connected to the first information processing device via the network, for transmitting the data to be used for the speech recognition by the speech recognition processing unit after performing conversion thereof into data having a format that disables a content thereof from being captured and also enables the speech recognition processing unit to perform the speech recognition processing, and constructing the resultant data returned from the first information processing device into a content being a valid recognition result.

A speech recognition request device according to this invention includes: a communication unit connected via a network to a speech recognition device including a speech recognition processing unit for receiving data to be used for speech recognition transmitted via the network, carrying out speech recognition processing, and returning resultant data; an information conversion unit for converting the data to be used for the speech recognition by the speech recognition processing unit into data having a format that disables a content thereof from being captured and also enables the speech recognition processing unit to perform the speech recognition processing; and an authentication result construction unit for reconstructing the resultant data returned from the speech recognition device after performing the speech recognition on the converted data into a speech recognition result that enables a content being a valid recognition result to be captured, based on the converted content.

Effect of the Invention

According to this invention, it is possible to provide a speech recognition system capable of secret speech recognition which suppresses a risk that a content of a user's utterance may be leaked to the third party to a minimum level in a case where a speech recognition function is realized as a service provided via a network.

Further, according to this invention, it is possible to provide a speech recognition system capable of secret speech recognition which suppresses a risk that a content expected to be uttered by the user or special information related to a task or domain to be used for a speech recognition technology by the user may be leaked to the third party to a minimum level in a case where the speech recognition function is realized as the service provided via the network.

REFERENCE SIGNS LIST

Figure 1:
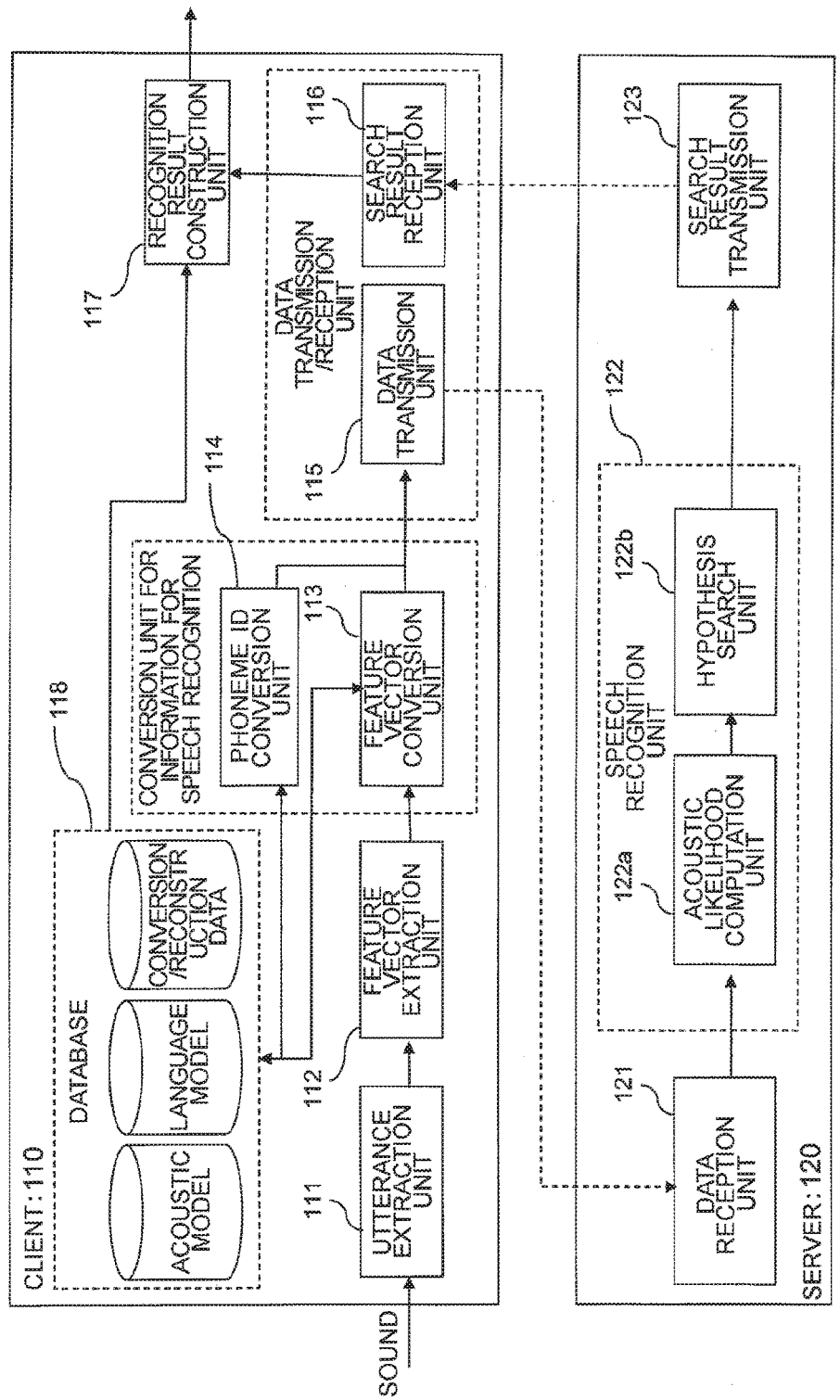
FIG. 1 is a block diagram illustrating a configuration of a first embodiment.

110 client (speech recognition request device)
111 utterance extraction unit (utterance extraction means)
112 feature vector extraction unit (feature vector extraction means)
113 feature vector conversion unit (feature vector conversion means)
114 phoneme ID conversion unit (phoneme ID conversion means)
115 data transmission unit (data transmission means)
116 search result reception unit (search result reception means)
117 recognition result construction unit (recognition result construction means)
118 database (data recording means)

120 server (speech recognition device)
121 data reception unit (data reception means)
122 speech recognition unit (data reception means)
122a acoustic likelihood computation unit (acoustic likelihood computation means)
122b hypothesis search unit (hypothesis search means)
123 search result transmission unit (search result transmission means)

BEST MODE FOR EMBODYING THE INVENTION

Next, a mode for embodying the invention is described in detail by referring to the accompanying drawings. Note that, to clarify the description, simplification or omission would be made about descriptions which are related to inputs, control processing, display, communications, and the like all of which have less to do with this invention.

Here, to facilitate an understanding of the invention, premised issues according to a first embodiment would be summed up.

A content (information) to be made secret includes an uttered content (information converted into data) itself and a content that can be uttered (information related to utterance: information to be used for speech recognition).

The former is caused to leak by restoring speech, and the latter is caused to leak by decrypting vocabulary information included in a language model or other such operation.

The speech can be restored from an acoustic feature although incompletely.

Even if the speech itself cannot be restored, one that knows details of the acoustic feature can restore an utterance content although incompletely by performing corresponding speech recognition processing.

Normally, a speech recognition server provider knows what kind of feature is used during an operation of a recognition processing unit of a recognition server provided by itself.

Therefore, at least the speech recognition server provider can restore the utterance content from the acoustic feature.

The vocabulary information included in the language model normally includes at least pronunciation information, and in most cases, further includes a representation character string.

Normally, the pronunciation information represents data that can be converted into a phoneme ID string corresponding to an acoustic model to be used by a given procedure or the phoneme ID string itself.

In the former case, the recognition processing unit of the recognition server is supposed to know the conversion procedure.

Therefore, at least the speech recognition server provider can decrypt the vocabulary information included in the language model.

In the latter case, phoneme IDs cannot seemingly be decrypted by a human, but the one that knows the details of the acoustic model can grasp phonemes indicated by the respective phoneme IDs.

Normally, the acoustic model is difficult for a user to construct, and is generally constructed and provided by the speech recognition server provider or another provider.

That is, the speech recognition server provider or another acoustic model provider knows details of the phoneme IDs.

In other words, the speech recognition server provider can know the details of the phoneme IDs without being noticed by the user.

Therefore, at least the speech recognition server provider can decrypt the vocabulary information included in the language model.

From the above-mentioned points, in order to carry out secret speech recognition via the network, consideration should be made about at lease one measure of:
using the acoustic feature the details of which cannot be easily known by the speech recognition server provider; and
using the phoneme IDs the details of which cannot be easily known by the speech recognition server provider,
in addition to general leak prevention of speech data on a communication channel.

FIG. 1 illustrates a configuration of the first embodiment of this invention. By referring to FIG. 1, the first embodiment of this invention includes a client 110 and a server 120.

Each thereof includes components for performing the following operations:

The client 110 includes an utterance extraction unit 111, a feature vector extraction unit 112, a feature vector conversion unit 113, a phoneme ID conversion unit 114, a transmission unit 115, a search result reception unit 116, and a recognition result construction unit 117. Further included therein is a database 118, which stores an acoustic model, a language model, and conversion/reconstruction data. The conversion/reconstruction data is used by the feature vector conversion unit 113, the phoneme ID conversion unit 114, and the recognition result construction unit 117. Note that, the conversion/reconstruction data may be previously set in the feature vector conversion unit 113, the phoneme ID conversion unit 114, and the recognition result construction unit 117.

The utterance extraction unit 111 extracts a speech from acoustic sound and outputs the speech as the speech data. For example, a segment that involves actual utterance (utterance segment) is extracted from the acoustic data by discriminating from a segment that does not (silent segment). Further, noise is separated from the speech and eliminated.

The feature vector extraction unit 112 extracts a set (feature vector) of the acoustic features such as cepstrum, power, and Δ power from the speech data.

The feature vector conversion unit 113 converts the feature vector into data having a format that disables the third party from capturing or perceiving a content thereof. At this time, the feature vector conversion unit 113 performs conversion processing so as to guarantee that, in a case where an acoustic likelihood computation unit 122a of the server 120 performs an acoustic likelihood calculation on the data after conversion by using the appropriately-converted acoustic model, an output result thereof has the same value as or an approximate value to an output result obtained from a combination of the acoustic model before the conversion and the feature vector. Examples of the conversion include shuffling the order of feature vector and adding a dimension that is redundant and can be ignored in terms of the calculation.

The phoneme ID conversion unit 114 converts the acoustic model and the phoneme IDs of the language model into the data having a format that disables the third party from perceiving contents thereof. Further, information unnecessary for the speech recognition processing performed on the server 120 is deleted from the acoustic model and the language model. In addition, depending on the content of the conversion processing, information necessary for restoration thereof is recorded in the database 118 as the conversion/reconstruction data. Examples of the conversion and deletion include shuffling the phoneme IDs and word IDs and deleting the representation character string and the like from the language model. The kind of conversion processing to be performed may be supplied in advance or may be dynamically determined.

Note that, processing operations of the feature vector conversion unit 113 and the phoneme ID conversion unit 114 are described later in detail.

The data transmission unit 115 transmits the converted data such as the feature vector, the acoustic model, and the language model to the server 120 as appropriate.

The search result reception unit 116 receives the output of a speech recognition unit 122 such as a maximum-likelihood word ID string via a search result transmission unit 123 of the server 120.

The recognition result construction unit 117 references the conversion/reconstruction data recorded in the database 118 regarding the maximum-likelihood word ID string received from the search result reception unit 116 to restore the data subjected to the conversion by the phoneme ID conversion unit 114. For example, in the case where the word IDs has been shuffled, conversion reverse thereto is performed to reconstruct the word IDs within the language model before the conversion. The recognition result construction unit 117 references the language model before the conversion by using the thus-restored word IDs to thereby construct the recognition result being the same as a recognition result obtained by an existing system. That is, almost without affecting a speech recognition result, the server 120 that performs the speech recognition can be disabled from capturing the content of the data used for the speech recognition.

The server 120 includes a data reception unit 121, the speech recognition unit 122, and the search result transmission unit 123.

The data reception unit 121 receives the data used for the speech recognition from the client 110. Note that, the data used for the speech recognition which are received in this embodiment are converted data which include the feature vector, the acoustic model, and the language model.

The speech recognition unit 122 references the acoustic model and the language model to make a search for a maximum-likelihood word string regarding a feature vector sequence. Note that, the speech recognition unit 122, which is to be described in detail, is divided into the acoustic likelihood computation unit 122a and a hypothesis search unit 122b.

The acoustic likelihood computation unit 122a obtains an acoustic likelihood of the feature vector regarding the respective phonemes within the acoustic model. The hypothesis search unit 122b uses the acoustic likelihood and a language likelihood to obtain the maximum-likelihood word ID string (=phoneme ID string). Note that, an implementation for collectively evaluating those processing steps may be employed.

The search result transmission unit 123 transmits the output of the speech recognition unit 122 such as the maximum-likelihood word ID string to the client 110.

Figure 2:
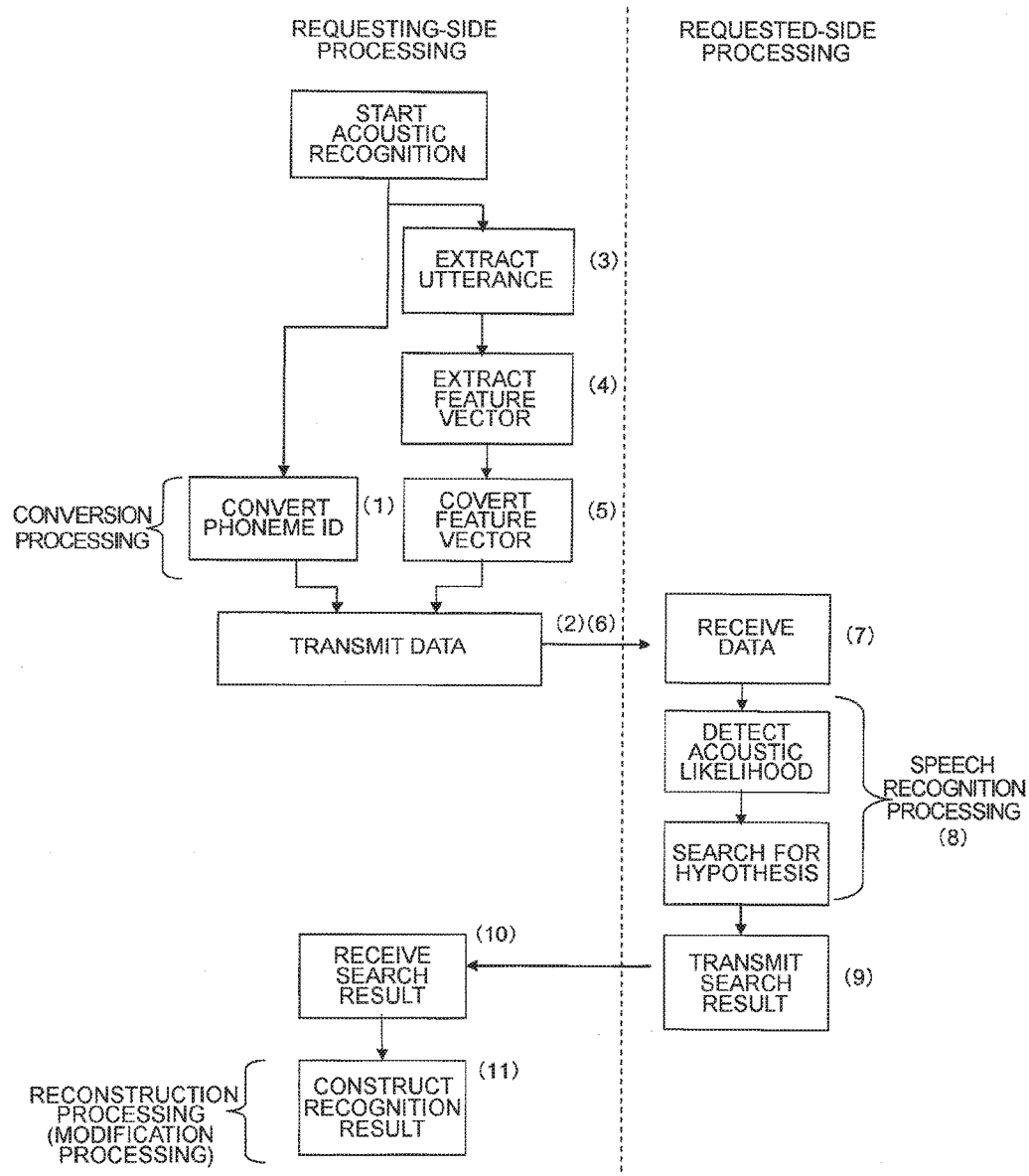
FIG. 2 is a flowchart illustrating speech recognition processing according to the first embodiment.

Next, an overall operation example of this embodiment is described in detail by referring to FIG. 2. In the following description, (C) indicates a client device, and (S) indicates a server device. Upon reception of an input of sound or a start instruction for speech recognition, the client device and the server device start the speech recognition and operate as follows.

1. (C) The phoneme ID conversion unit 114 converts the acoustic model and the phoneme IDs of the language model into the data having a format that disables the third party from perceiving or capturing contents thereof. The phoneme ID conversion unit 114 records information necessary for restoration corresponding to the content of the conversion processing in the database 118 as the conversion/reconstruction data. For example, the phoneme ID conversion unit 114 generates the acoustic model obtained by converting the phoneme IDs and the feature vector and the language model obtained by similarly converting the phoneme IDs and deleting the vocabulary information other than the phoneme ID string. In addition, the information used for the restoration performed by the recognition result construction unit 117 is recorded as the conversion/reconstruction data in the database 118. Note that the conversion processing is described later in detail.

2. (C) The data transmission unit 115 transmits the acoustic model (acoustic model after conversion) and the language model (language model after conversion) that have been generated after the conversion to the server 120 as information for speech recognition.

3. (C) The utterance extraction unit 111 cuts out a speech segment from the input sound (speech) in parallel with the above-mentioned processing steps 1 and 2.

4. (C) The feature vector extraction unit 112 computes a group (feature vector) of acoustic features within respective minute segments (frames) of the cut-out speech segment.

5. (C) The feature vector conversion unit 113 converts the computed feature vector into a data structure having a format that disables the third party from capturing a content thereof and also obtains, from a recognition processing result of the speech recognition unit 122, a data structure of constructing a normal or valid processing result. Note that, the conversion is described later in detail.

6. (C) The data transmission unit 115 transmits the converted feature vector (feature vector after conversion) to the server 120 as the information for speech recognition.

Note that, the above-mentioned processing steps 1 and 2 and the above-mentioned processing steps 3 to 6 may be performed in parallel with each other.

7. (S) The data reception unit 121 receives the information for speech recognition after conversion such as the acoustic model after conversion, the language model after conversion, and the feature vector after conversion from the client 110.

8. (S) The speech recognition unit 122 searches for the maximum-likelihood word ID string regarding the feature vector sequence while referencing the acoustic model and the language model that have been received. Note that, an example of search processing is described later in detail.

9. (S) The search result transmission unit 123 transmits the word ID string and the like to the client 110 as speech recognition result data obtained as a search result. As appropriate, the search result transmission unit 123 also transmits N word ID strings (N-best) that are top-ranked in the likelihood or score, likelihood information on the word ID strings, a search space itself (lattice or word graph), or the like together.

10. (C) The search result reception unit 116 receives the word ID string of the search result and the like (speech recognition result data) from the server 120.

11. (C) The recognition result construction unit 117 acquires word information corresponding to the respective word IDs of the word ID string from the language model before conversion, and generates the final word string of the recognition result. As necessary, the N-best, the word graph, and the like are processed in the same manner.

Here, details of the search processing are described below.

8-1. (S) The acoustic likelihood computation unit 122a performs processing for obtaining the acoustic likelihoods regarding the respective phonemes included in the acoustic model (acoustic model after conversion) for each feature vector.

8-2. (S) Further, the acoustic likelihood computation unit 122a references a word (word ID) regarding the phoneme ID string corresponding to a pronunciation of any one of words included in the language model (language model after conversion), and performs computation processing for a likelihood (language likelihood) obtained from information on adequacy of the word ID string similarly included in the language model.

8-3. (S) The hypothesis search unit 122b performs the search processing for the word ID string that gives the greatest likelihood to a feature vector string while referencing the above-mentioned the acoustic likelihood and the language likelihood.

8-4. (S) Note that, the hypothesis search unit 122b may perform arbitrary rescoring processing as necessary and assume the word ID string having the highest score as a result thereof as the search result.

Next, an operation of one conversion processing (conversion processing using a mapping function) for the feature vector and the acoustic model is described in detail. Note that, information on the mapping function and the like described below is described within the conversion/reconstruction data. Further, a processing method using the mapping function may be previously stored in the respective units.

The conversion of the feature vector and the acoustic model using the mapping function which is performed by the feature vector conversion unit 113 and the phoneme ID conversion unit 114 relates to an operation of the speech recognition unit 122, in particular, the acoustic likelihood computation unit 122a included therein. Described below as an example is a process for recovery to the valid processing result in the case of using the mapping function.

The processing performed by the acoustic likelihood computation unit 122a is processing for obtaining the likelihood of the feature vector given to the respective phoneme. This can be expressed as processing that employs an acoustic likelihood function D being:

$$1\_A(V)=D(V,A)=(D(V,A\_1),D(V,A\_2), \ldots, D(V,A\_M))=(1\_A\_1, \ldots, 1\_A\_M)$$

where V represents the feature vector, A represents the acoustic model, and M kinds of phoneme are included therein.

When the conversion of the feature vector and the acoustic model which is performed by the feature vector conversion unit 113 and the phoneme ID conversion unit 114 is expressed by a given mapping function F=(f_v,f_a), a property required for f_v and f_a is that $D(f\_v(V),f\_a(A))=D(V, A)$ always holds true with regard to an arbitrary feature vector V.

If the above-mentioned statement holds true, $$1\_A(V)=D(V,A)=D(f\_v(V),f\_a(A))=1\_\{f\_a(A)\}(f\_v(V))$$

is derived, and hence even if the feature vector and the acoustic model that are converted by using the mapping function F are used, completely the same recognition result as that before conversion can be obtained.

A plurality of examples of the mapping function that satisfies such a property are taken.

The feature vector, if being a vector of N features, can be expressed by the following expression.

$$V=(v\_1, \ldots, v\_N)$$

Now, if the acoustic likelihood of the feature vector regarding a given phoneme is given by a total sum of the likelihoods regarding respective elements of the feature vector, the following expression holds true.

$$1\_\{A\_j\}(V)=D(V,A\_j)=D(v\_1,A\_\{1,j\})+ \ldots +D(v\_N, A\_\{N,j\})= \text{¥}\operatorname{sum}\_\{i,j\}\{D(v\_i,A\_\{i,j\})\}$$

Here, it is assumed that f_v shifts suffixes of the respective elements of the feature vector one by one to move the N-th element to the zeroth position. That is, the shift is caused as in the following expression.

$$f\_v((v\_1, \ldots, v\_N))=(v\_N,v\_1, \ldots, v\_\{N-1\})$$

Meanwhile, if f_a is a function that shifts a model regarding the ith feature within the acoustic model to the (i+1)th position, $$f\_a((A\_\{1,j\}, \ldots, A\_\{N,j\}))=((A\_\{N,j\}, A\_\{1,j\}, \ldots, A\_\{N-1,j\}))$$

is derived, and at this time, $$D(f\_v(V),f\_a(A\_j))=D(v\_N,A\_\{N,j\})+D(v\_1, A\_\{1,j\})+ \ldots +D(v\_\{N-1\},A\_\{N-1,j\})= \text{¥}\operatorname{sum}\_\{i,j\}\{D(v\_i,A\_\{i,j\})\}=D(V,A\_j)$$

is derived.

In general, if the acoustic likelihood is linear with respect to the likelihoods regarding respective elements of the feature vector, a mapping (k-shift function) that shifts the elements of the feature vector by k satisfies the required property. In addition, the order itself has no meaning, and hence a mapping (shuffle function) that converts the order of the elements of the feature vector into an arbitrary order satisfies the required property as well.

Next, an example of another function is taken. It is assumed that the acoustic likelihood is defined as described above and that $$D(v\_i, \text{¥}\operatorname{alpha} A\_\{i,j\})= \text{¥}\operatorname{alpha} D(v\_i,A\_\{i,j\})$$

and $$\text{¥}\operatorname{sum}\_k\{D(c\_k,c\_k^\{-1\})\}=0$$

both hold true. Here, c_k and c_k^{-1} are a group of known values that satisfy the above-mentioned expression.

If the mappings (f_v,f_a) are given as $$f\_v((v\_1, \ldots, v\_N))=(v\_1, \ldots, v\_N,c\_1, \ldots, c\_L, v\_1)$$

$$f\_a((A\_\{1,j\}, \ldots, A\_\{N,j\}))=(A\_\{1,j\}/2, \ldots, A\_\{N, j\},c\_1^\{-1\}, \ldots, c\_L^\{-1\},A\_\{1,j\}/2)$$

respectively, $$D(f\_v(V), f\_a(A\_j)) = $$
$$D(v\_1, A\_\{1, j\}/2) + \ldots + D(v\_N, A\_\{N, j\}) + D(c\_1, c\_1^\{-1\}) + $$
$$\ldots D(c\_L, c\_L^\{-1\}) + D(v\_1, A\_\{1, j\}/2) = $$
$$D(v\_1, A\_\{1, j\})/2 + \ldots + D(v\_N, A\_\{N, j\}) + 0 + $$
$$D(v\_1, A\_\{1, j\})/2 = \text{Y}\operatorname{sum}\_\{i, j\}\{D(v\_i, A\_\{i, j\})\} = D(V, A\_j)$$

is derived.

In general, if the acoustic likelihood is linear with respect to the likelihoods regarding respective elements of the feature vector, and if a combination of the value of the feature for which the total sum of the acoustic likelihoods becomes zero and the model regarding the feature is known, it is possible to increase the number of apparent dimensions of the feature vector by using the combination.

Further, in general, if the acoustic likelihood is linear with respect to the likelihoods regarding respective elements of the feature vector, and if an acoustic likelihood function $D(v\_i, A\_\{i,j\})$ regarding the respective features is also linear, it is possible to increase the number of apparent dimensions of the feature vector by dividing a given feature into a plurality of elements.

If the acoustic likelihood computation unit 122*a* is established on the basis of the acoustic likelihood function exhibiting such a property, as many arbitrary mapping functions required by the embodiment of this invention as desired can be given by combining "shuffling of the feature vector" and "extension of the number of apparent dimensions" as described above.

Naturally, even the acoustic likelihood function having a different property from the one exemplified herein can be used as the system described in the embodiment of this invention as long as the mapping $F=(f\_v, f\_a)$ that satisfies $D(f\_v(V), f\_a(A))=D(V,A)$ can be defined.

Further, even when $D(V,A)$ and $D(f'\_v(V), f'\_a(A))$ do not completely match each other, if an error therebetween is sufficiently small, the embodiment of this invention can be realized by using such a mapping $F'=(f'\_v, f'\_a)$.

As described above, even if the feature vector conversion unit 113 and the phoneme ID conversion unit 114 convert the feature vector and the acoustic model by using the mapping function, the speech recognition unit 122 of the server 120 can obtain the recognition result the same as or approximate to the case where such conversion is not performed.

Next, the conversion processing for the acoustic model and the language model is described in detail.

The conversion for the acoustic model and the language model performed by the phoneme ID conversion unit 114 relates to the inside of the speech recognition unit 122, in particular, relates to the operation of the hypothesis search unit 122*b*.

In the processing of the hypothesis search unit 122*b*, it is necessary to determine whether or not a given phoneme string $a\_1, \ldots, a\_N$ forms a given word w.

In other words, with regard to the language model L having M words, a lookup function that returns any one of 0 and 1 in relation to all the words w included in L can be expressed as the following expression.

$$S\_L(a\_1, \ldots, a\_N) = T(L, a\_1, \ldots, a\_N) = \{e\_1, \ldots, e\_M\}$$

where $e\_j \in \{0,1\}$

Here, $e\_j$ with respect to the suffix j indicates whether a word $w\_j$ is formed by the phoneme string (=1) or not (=0).

At first glance, this function seems to have an extremely high calculation load, but can be obtained speedily by using a TRIE structure and the like.

In actuality, the phoneme ID string and the word ID are often used instead of the phoneme string itself and the word itself, respectively, but are both correspond to the phoneme and the word on a one-to-one basis, and hence only the phoneme and the word are described below.

If the conversion for the acoustic model and the language model performed by the phoneme ID conversion unit 114 is expressed by a given mapping function $G=(g\_1, g\_a)$, the property required for $g\_1$ and $g\_a$ is that the following expression always holds true with respect to an arbitrary phoneme string $a\_1, \ldots, a\_N$.

$$T(L, A, a\_1, \ldots, a\_N) = T(g\_1(L), g\_a(A), g\_a(a\_1), \ldots, g\_a(a\_N))$$

If the above-mentioned expression holds true, the following expression holds true, and hence completely the same recognition result as the case of using the acoustic model and the language model before conversion can be obtained even by using the acoustic model and the language model converted by the mapping function G.

$$S\_\{L, A\}(a\_1, \ldots, a\_N) =$$
$$T(L, A, a\_1, \ldots, a\_N) = T(g\_1(L), g\_a(A), g\_a(a\_1), \ldots, g\_a(a\_N)) =$$
$$S\_\{g\_1(L), g\_a(A)\}(g\_a(a\_1), \ldots, g\_a(a\_N))$$

In the same manner as the mapping regarding the above-mentioned the feature vector, such a mapping as to shuffle the phoneme IDs or the word IDs satisfies this property.

Further, when there is a phoneme ID $p\_i$ corresponding to a given phoneme $a\_i$, such a mapping as to add a new phoneme ID corresponding to the phoneme $a\_i$ as $p\_i'$ also satisfies this property.

The above-mentioned two conversion processing steps can be conversion processing steps that satisfy the following requirements after all.

Requirements:

When a mapping function $\Phi=\{\phi\}$ used for the conversion maps a data structure X and a data structure Y to $\phi\_x\{X\}$ and $\phi\_y\{Y\}$, respectively,
with regard to a function $F(X,Y)$ used by the recognition processing unit,
$F(X,Y)$ and $F(\phi\_x\{X\}, \phi\_y\{Y\})$
constantly have the same values.

Specific examples of F include:

(feature vector)+(acoustic model)→(acoustic likelihood)

where X represents the feature vector and Y represents the acoustic model; and (phoneme ID string)+(acoustic model)+(language model)→(word establishment vector)

where X represents the acoustic model and Y represents the language model.

Note that, if the implementation of the speech recognition unit 122, in particular, the hypothesis search unit 122*b* is expressed as a search problem that regards the likelihood as a score and obtains a path exhibiting the highest score, only a magnitude relationship between the likelihoods may be saved, and hence what actually matters in the conversion performed on the feature vector and the acoustic model is such a property that:
not the equivalence of $F(X,Y)$ and $F(\phi\_x\{X\}, \phi\_y\{Y\})$,
but a ratio between $F(X,Y)$ and $F(\phi\_x\{X\}, \phi\_y\{Y\})$
is constantly fixed. Therefore, in the case of using such the speech recognition unit 122, the above-mentioned requirements are relaxed. Further, no matter what kind of speech recognition unit is used, the error between $F(X,Y)$ and $F(\phi\_x\{X\}, \phi\_y\{Y\})$ which is sufficiently small can be permitted because the error hardly affects recognition precision.

On the other hand, in the conversion performed on the phoneme ID, the acoustic model, and the language model, the ratio equality or error is not enough to satisfy the requirements, and the equivalence is strictly required. Otherwise, an adverse influence is exerted on the recognition precision.

Next, the conversion processing for the language model is described in detail.

In the conversion for language model performed by the phoneme ID conversion unit 114, information related to the respective words included in the language model is basically deleted other than information on the phoneme ID string (with the phoneme ID also converted as described above by the mapping function). This not only achieves secrecy but is also effective in reduction of a communication amount.

However, if there is other data to be referenced by the speech recognition unit 122 (information that affects a speech recognition processing result), it is desirable that the data are not deleted. Examples thereof include data such as part-of-speech information of the word and class information to which the word belongs. Note that, the speech recognition unit 122 that requests for data that may be involved in the leak of the word information should be avoided from being used for the speech recognition processing. For example, it is assumed that the speech recognition unit 122 that requests for a display character string of the word is not used in this embodiment. In a case of wishing to use the speech recognition processing unit that requests for such data at any cost, there is an attempt to avoid the leak by a method of, for example, performing the mapping in the same manner as the phoneme ID and the word ID.

Next described are a timing for the feature vector conversion and the phoneme ID conversion and a timing to switch the conversion operation.

The feature vector conversion is executed each time when a new feature vector is obtained.

The conversion of the acoustic model and the phoneme IDs of the language model may be performed once prior to the speech recognition as described above.

However, continuous use of the model converted by the same mapping function increases a risk that the mapping function may be conjectured by using a statistical method or the like.

Therefore, the secrecy against the third party is enhanced by periodically switching a behavior of the conversion operation such as changing the mapping function to another one.

Specifically, the switching may be performed at the timing of once every several utterances or once every several minutes. On the other hand, if a calculation amount necessary for the conversion operation and the communication amount for transmitting the model after conversion to the server are taken into consideration, it is not appropriate to perform the switching very frequently.

The timing and frequency for the switching may have values obtained in consideration of overhead (calculation amount necessary for the conversion operation and communication amount for transmitting the model after conversion to the server) that occurs due to the frequent switching. Further, alteration may be performed as appropriate at a timing at which a processing amount or the communication amount is lowered, for example, during the silent segment.

Next described are effects of the embodiment for performing the conversion using the mapping function described above.

The embodiment for performing the conversion using the mapping function is configured to convert the feature vector by the mapping function and then transmit the feature vector to the server, and hence even if the third party obtains the feature vector on the communication channel or the server, it can be made difficult for the third party to immediately restore the speech therefrom.

On the other hand, the acoustic model is also converted by the mapping function selected so as to return the same acoustic likelihood as the feature vector before conversion, which guarantees that the same acoustic likelihood is computed, in other words, the same recognition result is obtained, as in the case where the feature vector is not converted.

Further, the above-mentioned mode is configured to avoid transmitting the information on the representation character string within the information on the respective word entries included in the language model to the server and to also convert the phoneme ID string indicating the pronunciation of the word entry by the mapping function and then transmit the phoneme ID string to the server. Hence, even if the third party that knows the structure of the language model obtains the phoneme ID string, it can be made difficult for the third party to immediately know the information such as the pronunciation and surface form of the word included therein.

On the other hand, the acoustic model is also converted by the mapping function selected so as to return the same outcome of the word with regard to the same phoneme string as the language model before conversion, which guarantees that the same outcome regarding the word is obtained, in other words, the same recognition result is obtained, as in the case where the language model is not converted with regard to the same phoneme string.

Figure 3:
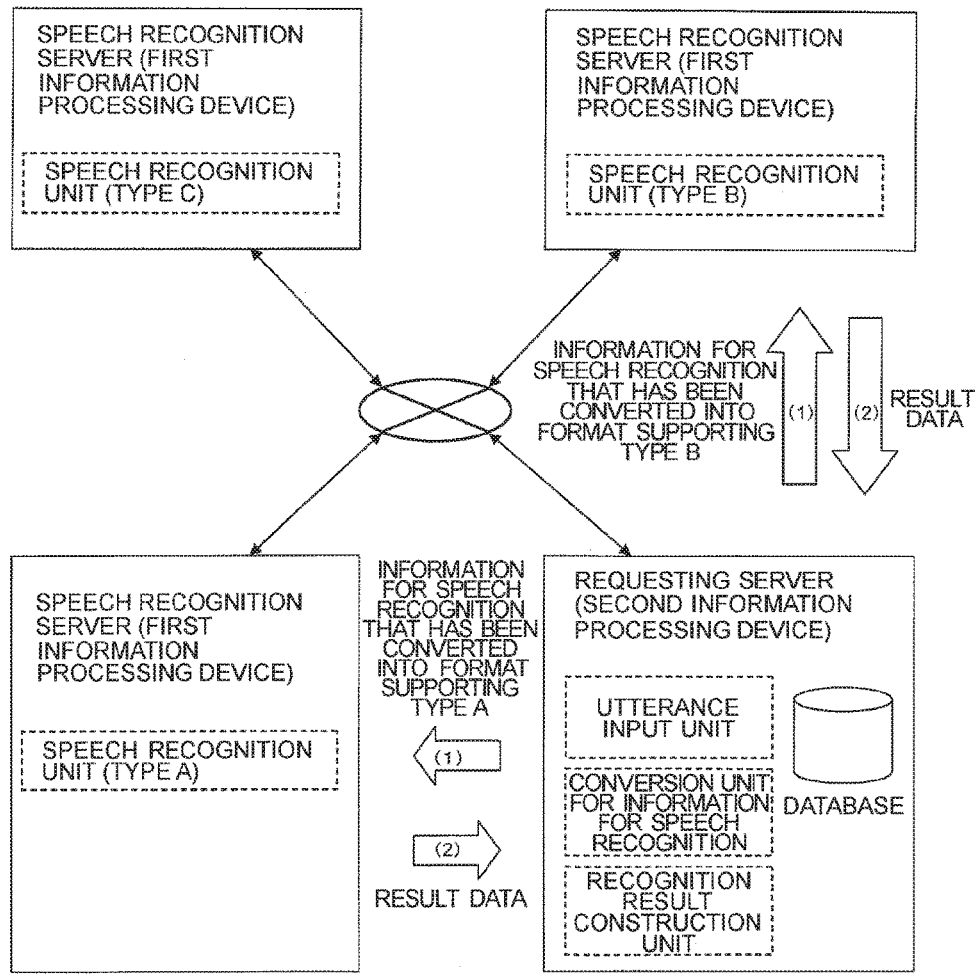
FIG. 3 is a block diagram illustrating a configuration of a second embodiment.

Next, a second embodiment is described by referring to FIG. 3. Note that, to clarify the description, descriptions of the same parts as those of the first embodiment are simplified or omitted.

FIG. 3 is a block diagram illustrating a configuration of the second embodiment. A speech recognition system according to the second embodiment includes a plurality of speech recognition servers. Further, an information processing device that requests for the speech recognition is also a server.

The plurality of speech recognition servers correspond to mutually different items of converted acoustic recognition information data (in the figure, types A, B, and C). The server that requests for the speech recognition previously stores specifications of respective acoustic recognition servers, and stores the converted acoustic recognition information data to be transmitted to the respective acoustic recognition servers. Note that, such specifications of the acoustic recognition server and the like may be managed integrally with the conversion/reconstruction data or may be managed by another method.

Even such a configuration enables the speech recognition to be performed on the speech acquired by the server that requests for the speech recognition while achieving the secrecy against the third party. An operation example thereof is described below.

The server that requests for the speech recognition uses the respective units to carry out utterance extraction processing and feature vector extraction processing, then selects the acoustic recognition server to be used, converts the information for speech recognition into data having such a format that enables the recovery to the valid processing result corresponding to the selected acoustic recognition server, and transmits the data to the selected acoustic recognition server.

The server that requests for the speech recognition uses the respective units to construct result data returned from the acoustic recognition server into the speech recognition result being a valid recognition result and output the resultant.

At this time, a shuffling method and the acoustic recognition server to be a transmission destination are switched as necessary or with the lapse of time.

Figure 4:
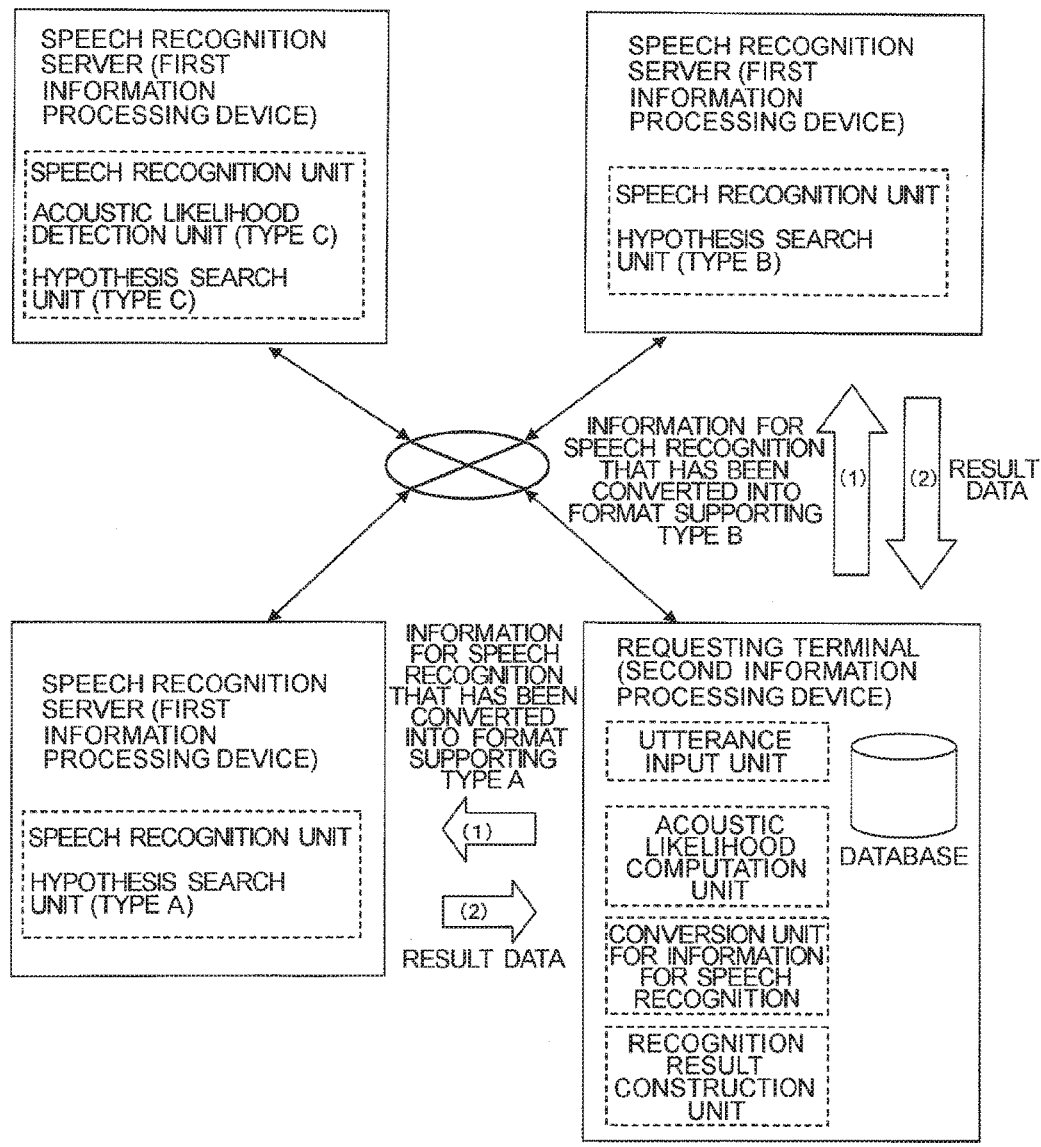
FIG. 4 is a block diagram illustrating a configuration of a third embodiment.

Next, a third embodiment is described by referring to FIG. 4. Note that, to clarify the description, descriptions of the same parts as those of the first and second embodiments are simplified or omitted.

FIG. 4 is a block diagram illustrating a configuration of the third embodiment. A plurality of speech recognition servers of a speech recognition system according to the third embodiment provide only the service of hypothesis search processing. Alternatively, the speech recognition servers are capable of performing acoustic likelihood detection processing and the hypothesis search processing, and can provide only the service of the hypothesis search processing.

The information processing device that requests for the speech recognition includes an acoustic likelihood detection unit, and is enabled to perform a distance calculation.

The plurality of speech recognition servers perform requested speech recognition processing (acoustic likelihood detection processing and hypothesis search processing) respectively, and return the result thereof. A requesting terminal that requests for the speech recognition previously stores specifications of respective acoustic recognition servers, and stores the converted acoustic recognition information data to be transmitted to the respective acoustic recognition servers. Note that, such specifications of the acoustic recognition server and the like may be managed integrally with the conversion/reconstruction data or may be managed by another method.

Even such a configuration enables the speech recognition to be performed on the speech acquired by the requesting terminal that requests for the speech recognition while achieving the secrecy against the third party. An operation example thereof is described below.

The requesting terminal that requests for the speech recognition uses the respective units to carry out utterance extraction processing, feature vector extraction processing, and acoustic likelihood detection processing, then selects the acoustic recognition server to be used, converts information on detected acoustic likelihood and the information for speech recognition into data having such a format that enables the recovery to the valid processing result corresponding to the selected acoustic recognition server, and transmits the data to the selected acoustic recognition server.

Subsequently, the requesting terminal uses the respective units to construct result data returned from the acoustic recognition server into the speech recognition result being a valid recognition result and output the resultant.

At this time, a shuffling method and the acoustic recognition server to be a transmission destination are switched as necessary or with the lapse of time.

Such a configuration can omit shuffling processing for the acoustic model or the transmission of the acoustic model. That is, if the terminal has such a calculation ability as to perform acoustic likelihood computation processing, the communication amount can be compressed.

Figure 5:
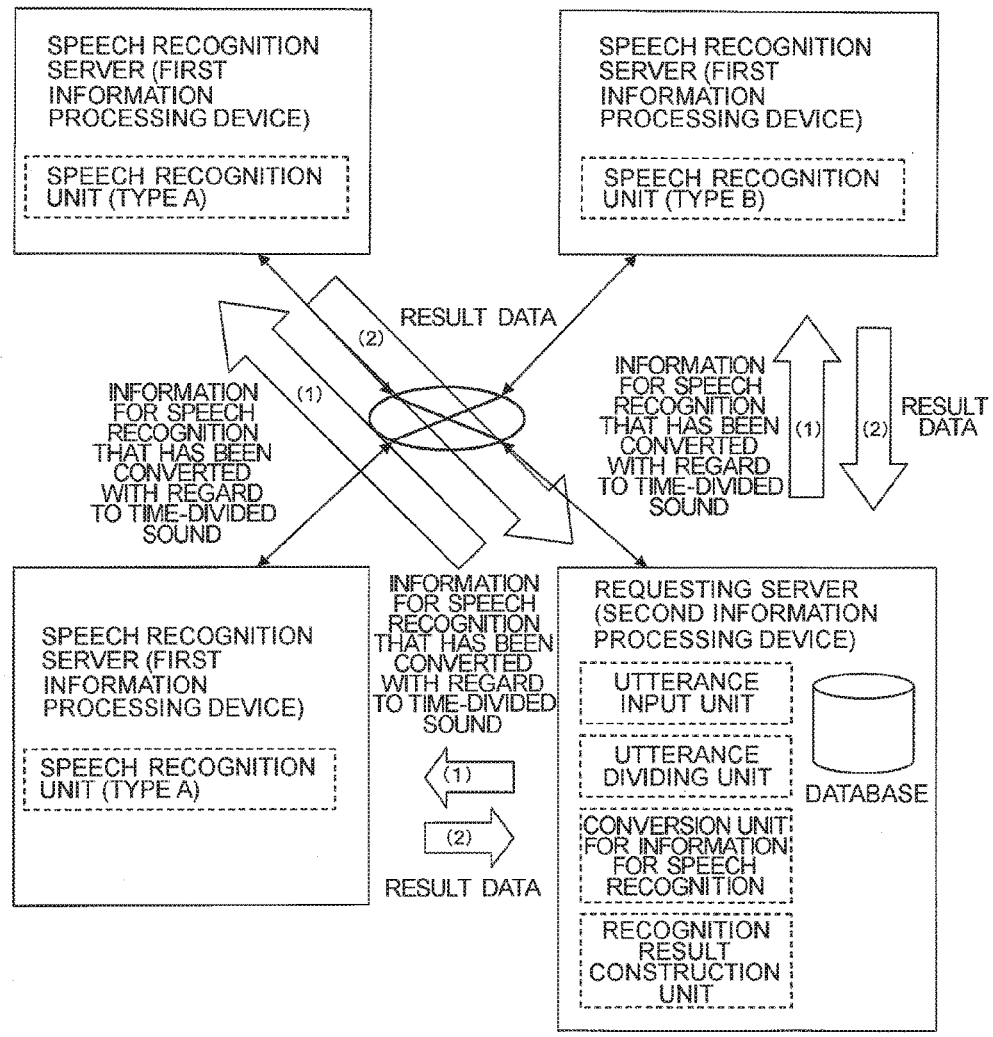
FIG. 5 is a block diagram illustrating a configuration of a fourth embodiment.

Next, a fourth embodiment is described by referring to FIG. 5. Note that, to clarify the description, descriptions of the same parts as those of other embodiments are simplified or omitted.

FIG. 5 is a block diagram illustrating a configuration of the fourth embodiment. A plurality of speech recognition servers of a speech recognition system according to the fourth embodiment each provide a speech recognition service.

The information processing device that requests for the speech recognition includes an utterance dividing unit for extracting the feature vector by performing time division on the sound (speech) input thereto. Note that, instead of the time division for the feature vector, division may be performed in units of clauses or words of the speech.

The information processing device that requests for the speech recognition (requesting server) performs the shuffling or the like on a sequence relationship between the divided items of speech data, then subjects the resultant data to the conversion as the information for speech recognition, which is then transmitted separately to the plurality of speech recognition servers, and collectively reconstructs the results returned from the respective speech recognition servers.

Even such a configuration enables the speech recognition to be performed on the speech acquired by the terminal that requests for the speech recognition while achieving the secrecy against the third party.

At this time, a time-division interval, the shuffling method, and the acoustic recognition server to be the transmission destination are switched as necessary.

With such a configuration, only partial speech is transmitted to the individual speech recognition servers, and hence the restoration becomes more difficult with an increase of the number of speech recognition servers operated in parallel.

Figure 6:
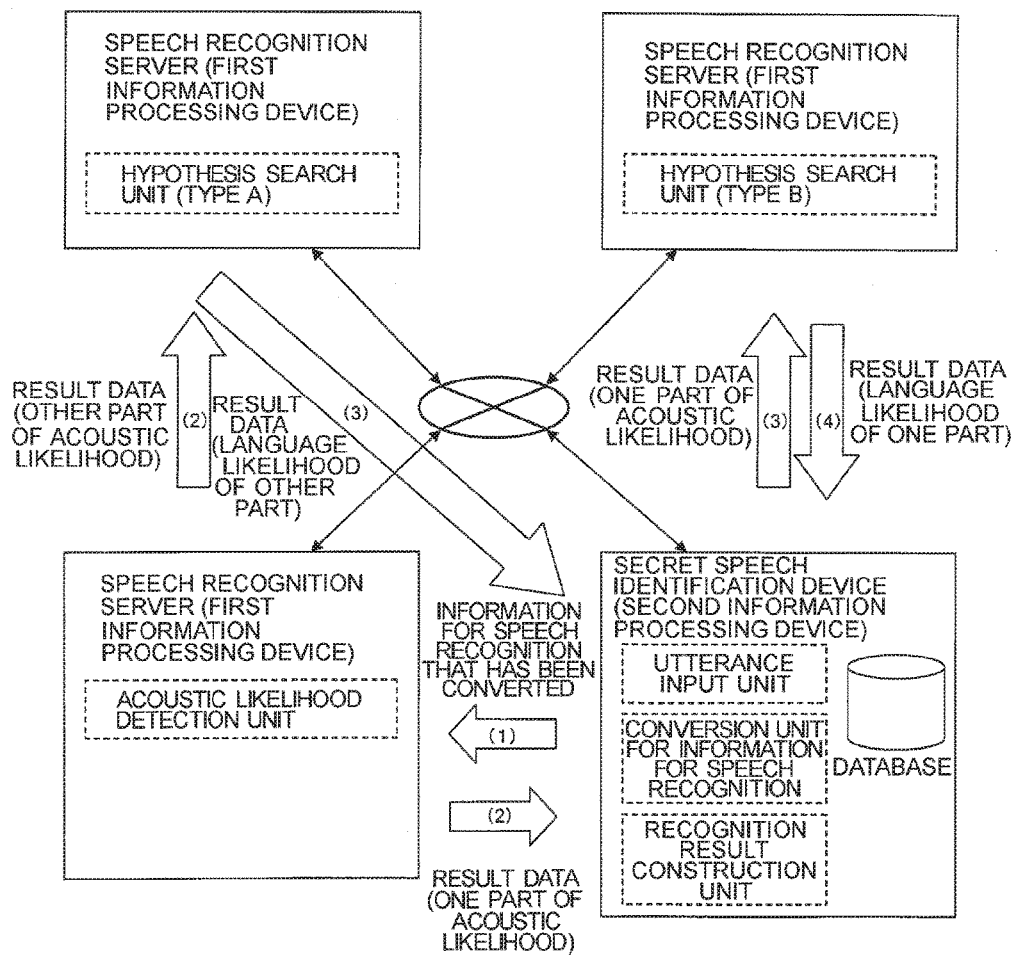
FIG. 6 is a block diagram illustrating a configuration of a fifth embodiment.
Figure 7:
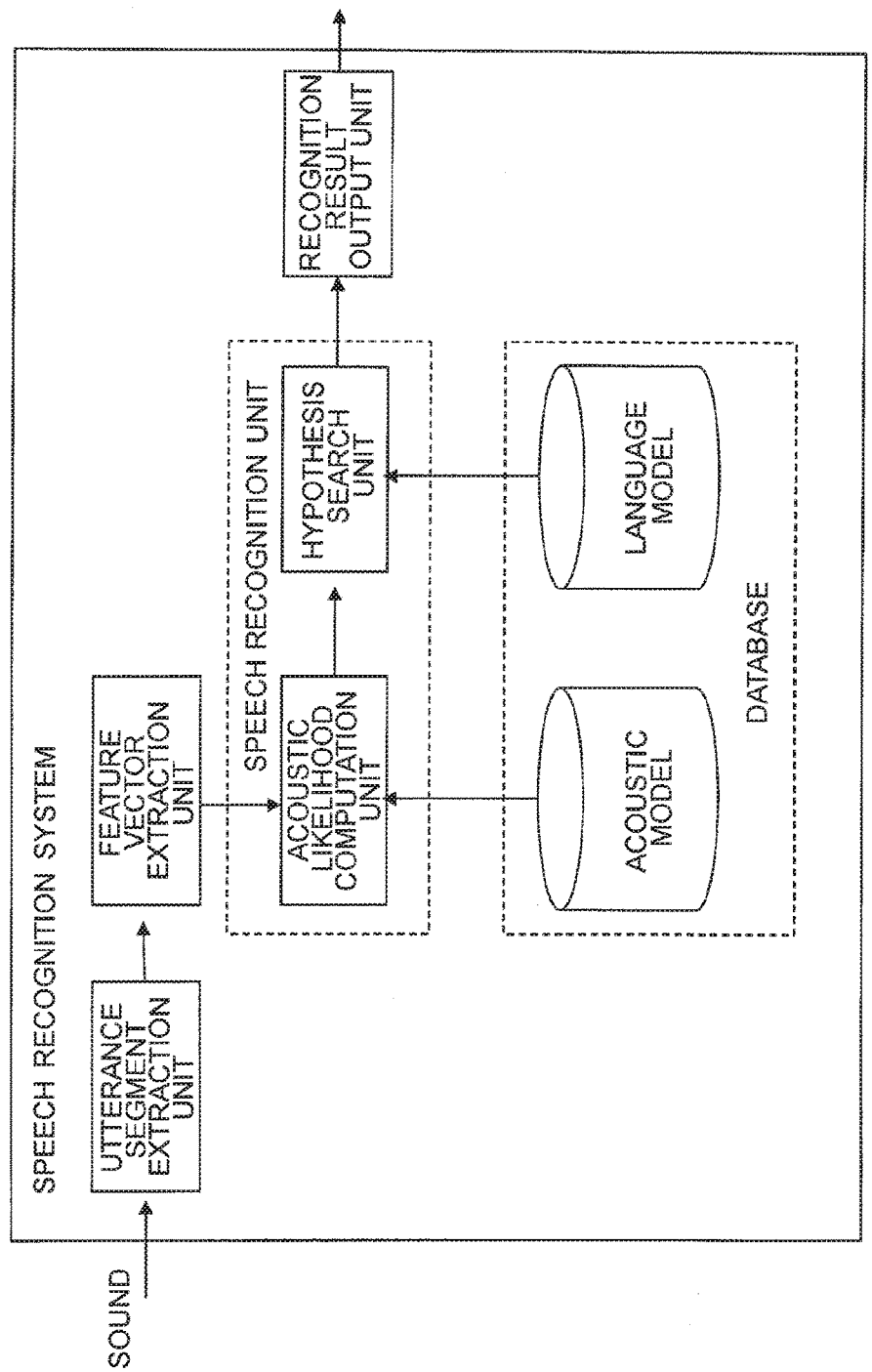
FIG. 7 is a block diagram illustrating an example of a configuration of a speech recognition system.
Figure 8:
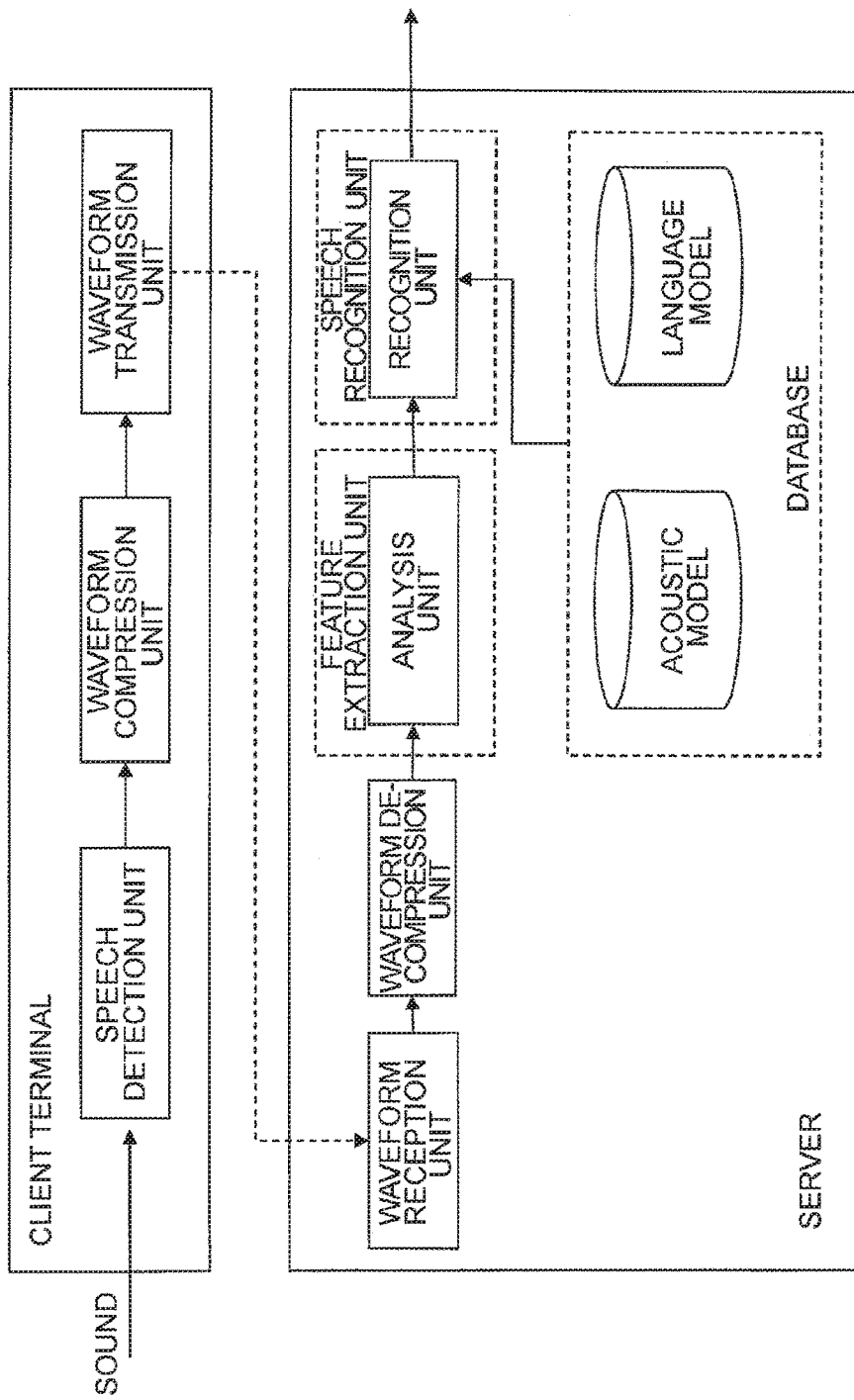
FIG. 8 is a block diagram illustrating an example of a configuration of the speech recognition system having a client-server structure.

Next, a fifth embodiment is described by referring to FIG. 6. Note that, to clarify the description, descriptions of the same parts as those of other embodiments are simplified or omitted.

FIG. 6 is a block diagram illustrating a configuration of a fifth embodiment. A speech recognition system according to the fifth embodiment has a mode in which the speech recognition server including the acoustic likelihood detection unit is used to generate result data on the acoustic likelihood and transfer the result data to another speech recognition server including the hypothesis search unit. Further, the speech recognition system may be configured such that a secret speech identification device instructs the speech recognition server including the acoustic likelihood detection unit to perform the transfer itself. Further, the speech recognition system may be configured such that the result data on the acoustic likelihood to be transferred is divided and transferred to the plurality of speech recognition servers each including the hypothesis search unit.

Even the above-mentioned configuration enables the speech recognition to be performed on the speech acquired by the device that requests for the speech recognition while achieving the secrecy against the third party.

Next, a sixth embodiment is described. Note that, to clarify the description, descriptions of the same parts as those of the other embodiments are simplified or omitted.

In the sixth embodiment, the speech data or the feature extracted on the secret speech identification device serving as a client is divided, the sequence relationship therebetween is shuffled, and the respective servers are requested for the speech recognition. The secret speech identification device subjects the speech recognition results sent from the respective servers to inverse processing to the shuffling performed before transmission, and reconstructs the content being the valid recognition result. That is, the secret speech identification device carries out the processing up to feature vector extraction and reconstruction processing, while the server carries out the others.

Such an operation can reduce communication load and load on the secret speech identification device.

Next described is an embodiment that does not use the mapping function. This embodiment has a feature of deleting the word or concatenation information on words for which the leak of information is feared from a dictionary. That is, unlike the other embodiments, the entry including the pronunciation information (=phoneme ID string information) is completely deleted. Alternatively, the same may not be included in the language model in the first place. As a result, the server that performs the speech recognition cannot detect the existence of the word including a trace of the existence at all.

A client terminal caused to perform the speech recognition receives the speech recognition result from the server, and in response to the result, executes second recognition processing for inserting the word and the concatenation information on words deleted from the dictionary. That is, information the leak of which is feared and which is not included in the recognition result sent from the server is regained by being subjected to second speech recognition processing (search processing).

A second speech recognition unit is provided within a recognition result construction unit, and uses the recognition result output by the speech recognition unit (first speech recognition unit) on the server as an input. This means that the input may be the word ID string having the maximum likelihood (=maximum-likelihood word ID string), the word ID strings exhibiting the top-N likelihoods (N-best), or the word graph. In the word graph, the word and its likelihood (one or both of language likelihood and acoustic likelihood or other standard score such as reliability) are assigned to each arc appearing in a graph structure generated halfway through the search processing, and the search processing is processing for finding a path exhibiting the highest total sum of the likelihoods.

The recognition result construction unit converts those into the word string, and further converts the word string into the phoneme string by using the pronunciation information. By performing the processing in this manner, only one phoneme string is obtained in the case where the maximum-likelihood word ID string is used as an input, and otherwise a plurality of phoneme strings are obtained.

Meanwhile, the word and a word concatenation deleted for fear of the leak are also converted into the phoneme string. Then, the second speech recognition unit takes out the phoneme strings from the recognition result returned from the server, and searches the phoneme strings for a segment that matches the phoneme string of the deleted word and word concatenation.

In this search processing, not only a strict match but also an ambiguous match can be performed if a confusion matrix which is a table of a discrimination difficulty between a given phoneme and another phoneme is separately provided. For example, if a difficulty to tell f from v is high, in a case where a match can be regarded as having occurred when there is only a match between f and v in a matching process within the deleted segment, those may be handled as a match by being regarded as the same.

If the processing in the above-mentioned manner is performed to find the phoneme string that matches the word or the word concatenation for which the leak is feared from the recognition result sent from the server (first recognition unit), the recognition result construction unit constructs the valid recognition result by replacing (inserting) the word or the word concatenation into the corresponding part.

As a merit of this method, the mapping for the word ID becomes unnecessary with the result that uploading of only the acoustic model and the dictionary suffices. In other words, by performing the processing in the above-mentioned manner, even if a strict language model prepared by the server is used, the secrecy can be ensured. Note that, the strict language model occupies most of the capacity of a broad-sense language model, which produces a remarkable effect in the reduction of the communication bandwidth between the server and the client.

Next, further another embodiment is described. This embodiment is configured to inhibit the client terminal from executing the acoustic likelihood calculation without involving the uploading of the acoustic model. That is, the extraction of the feature and the acoustic likelihood calculation are carried out on the server and transmitted, while the search processing is carried out on the client terminal. At this time, the acoustic data transmitted from the client terminal to the server is kept secret by the encryption operation that can be decrypted by the server and the mapping operation of mapping the content into data which cannot be perceived or captured by the server.

Such a configuration effectively operates as means for performing client-server speech recognition that guarantees the secrecy without particularly converting the language model.

As described above, according to this invention, the following effects can be obtained.

The first effect is to be able to reduce a risk that the utterance content of a speaker may be leaked to the third party. This is because, even if the third party acquires intermediate data (feature vector, phoneme ID string, and word string ID string) obtained by converting the speech data, it is necessary for the third party to know the details of how the phoneme ID and the like have been converted in order to restore the same, which can make it difficult for the third party to restore the speech data by performing the conversion as appropriate.

The second effect is to be able to reduce a risk that special information related to a task or domain may be leaked from the language model to the third party. This is because the language model temporarily retained on the server includes only the minimum word information such as the phoneme ID after conversion, the details of the conversion of the phoneme ID are unknown to the server, which can make it difficult for the third party to know the details of the content of the language model.

Note that, as have already been described, the third party referred to herein also includes a speech recognition service provider. Therefore, indirect effects of this invention include the ability to perform the speech recognition in the form of a network service also with regard to the speech whose secrecy is demanded extremely strongly, for example, speech related to privacy or a trade secret.

Note that, by using the technology described above, the speech recognition system may be configured in the following manner.

A speech recognition system, including: a first information processing device including a speech recognition processing unit for receiving data to be used for speech recognition transmitted via a network, carrying out speech recognition processing, and returning resultant data; and a second information processing device connected to the first information processing device via the network, for transmitting the data to be used for the speech recognition by the speech recognition processing unit after performing mapping thereof by using a mapping function unknown to the first information processing device, and constructing a speech recognition result by modifying, based on the mapping function used, the resultant data returned from the first information processing device into the same result as a result of performing the speech recognition without using the mapping function.

A speech recognition system, including a plurality of information processing devices that are connected to one another via a network and include a speech recognition processing unit in at least one information processing device. The requesting information processing device converts at least one data structure of data to be used for speech recognition processing by the speech recognition processing unit by using a mapping function and transmits the resultant to the information processing device including the speech recognition processing unit. The information processing device including the speech recognition processing unit carries out the speech recognition processing based on the converted data structure and transmits a result thereof. The requesting information processing device constructs the result of carrying out the speech recognition processing which is affected by the mapping function into a result of carrying out the speech recognition processing which is not affected by the mapping function.

A speech recognition system, which is configured by using the mapping function $\Phi$ in which, if $\Phi=\{\phi\}$ is used as the mapping function, and when a data structure X and a data structure Y are mapped to $\phi\_x\{X\}$ and $\phi\_y\{Y\}$, respectively, with regard to a function $F(X,Y)$ used by the speech recognition processing unit, values of $F(X,Y)$ and $F(\phi\_x\{X\},\phi\_y\{Y\})$ are constantly the same or constantly less than a given threshold value.

A speech recognition system, which is configured by using the mapping function $\Phi$ in which, if $\Phi=\{\phi\}$ is used as the mapping function, and when the data structure X and the data structure Y are mapped to $\phi\_x\{X\}$ and $\phi\_y\{Y\}$, respectively, with regard to the function $F(X,Y)$ used by the speech recognition processing unit, the ratio between $F(X,Y)$ and $F(\phi\_x\{X\},\phi\_y\{Y\})$ is constantly fixed.

A speech recognition system, which is configured by using the mapping function in which: with regard to a reference relationship between an index that refers to specific data included in a given data structure and a reference destination, a destination to which a given arbitrary index refers before mapping does not necessarily match a destination to which the same index refers after the mapping; and it is guaranteed that data at the reference destination to which any one of indices refers before the mapping is always referred to by any one of the indices after the mapping.

A speech recognition system, which is configured by using the mapping function which indicates shuffling of indices that refer to the specific data included in the given data structure.

A speech recognition system, which is configured by using the mapping function which adds an arbitrary number of indices to the specific data included in the given data structure.

A speech recognition system, in which at least one item of data to be used for speech recognition which is subjected to mapping by using the mapping function is retained before the mapping only on an information processing device for inputting a sound to be subjected to the speech recognition.

A speech recognition system, in which the data to be used by the speech recognition processing unit has a structure to which at least one selected from the group consisting of a structure of an acoustic model, a structure of a language model, and a structure of a feature vector is mapped.

A speech recognition system, in which: indices indicating respective features included in the feature vector are mapped by using the mapping function given by a device for inputting a sound to be subjected to speech recognition; and indices to models associated with respective features within the acoustic model are mapped by using the mapping function given by the device for inputting the sound to be subjected to the speech recognition.

A speech recognition system, in which: phoneme IDs being indices to phonemes included in the acoustic model are mapped by using the mapping function given by the device for inputting the sound; phoneme ID strings indicating pronunciations of respective words included in the language model are mapped by using the mapping function given by the device for inputting the sound; and at least information on representation character strings of the respective words included in the language model is deleted.

A speech recognition system, in which word IDs being indices to the respective words included in the language model are mapped by using the mapping function given by the device for inputting the sound.

A speech recognition system, in which an information processing device for inputting speech data includes at least an acoustic likelihood computation unit and is configured to: map phoneme ID strings indicating pronunciations of respective words included in the language model by using the mapping function given by the information processing device for inputting speech data, and delete at least information on representation character strings of the respective words included in the language model; compute acoustic likelihoods of all known phonemes or necessary phonemes for each frame of the speech data to generate a sequence of a group of the phoneme IDs and acoustic likelihoods that are mapped by using the mapping function given by the information processing device for inputting speech data; and transmit the sequence of the group of the mapped phoneme IDs and acoustic likelihoods and the language model after the mapping to the information processing device including a hypothesis search unit.

A speech recognition system, in which an information processing device for inputting speech data is configured to: divide the speech data into blocks; map a time sequence among the divided blocks by using the mapping function given by the information processing device for inputting speech data; transmit the blocks of speech to an information processing device for performing speech recognition based on the time sequence after the mapping; receive any one of a feature vector or a sequence of a group of phoneme IDs and acoustic likelihoods from the information processing device for performing the speech recognition; and restore the time sequence by using an inverse function to the mapping function given by the information processing device for inputting speech data.

Further, specific configurations of this invention are not limited to the above-mentioned embodiments, and changes within the scope that does not depart from the gist of the invention are also included in this invention. For example, a combination of the respective characteristics of the above-mentioned embodiments may be included in this invention.

Further, the respective units of a speech recognition request device may be realized by hardware or by using a combination of hardware and software. In the mode that combines hardware and software, the respective units and various means are realized by causing a speech recognition program to be expanded in a RAM and hardware such as a CPU to be operated according to the program. Further, the program may be distributed by being recorded on a recording medium. The program recorded on the recording medium is read into a memory in a wired manner, in a wireless manner, or via the recording medium itself to cause a control unit and the like to operate. Note that, examples of the recording medium include an optical disc, a magnetic disk, a semiconductor memory device, and a hard disk.

This invention can be applied for the purpose of increasing the secrecy in all the applications for performing the client-server speech recognition.

For example, this invention can be applied for constructing a SaaS-based speech recognition system for recognizing the speech including a trade secret. Further, this invention can be applied for constructing a SaaS-based speech recognition system for the speech high in privacy such as a diary.

Further, for example, in a case of constructing a speech-controlled online store website that allows a menu selection and the like to be performed by speech, if the website is constructed by using the SaaS-based speech recognition system using this invention, the user can keep his/her purchase history and the like from being known by at least a SaaS-based speech recognition system provider. This serves as a merit for a webmaster of the speech-controlled online store website in that a fear of the leak of customer information decreases.

Further, from the viewpoint of the SaaS-based speech recognition system provider, the use of this invention eliminates the need, although temporarily, for retaining the speech of users and the language model including a vocabulary corresponding to personal information on the users on the self-managed speech recognition server, which can avoid unintended leak of the personal information to a cracker or the like.

This application claims priority from Japanese Patent Application No. 2009-247874, filed on Oct. 28, 2009, the entire disclosure of which is incorporated herein by reference.

The invention claimed is:

1. A speech recognition system comprising:
a first information processing device comprising a speech recognition processing unit for receiving data to be used for speech recognition transmitted via a network, carrying out speech recognition processing, and returning resultant data representative of a result of the speech recognition; and
a second information processing device configured:
   to be connected to the first information processing device via the network,
   to perform mapping of pre-mapping data by using a mapping function unknown to the first information processing device to obtain post-mapping data,
   to transmit the post-mapping data to be used for the speech recognition by the speech recognition processing unit to the first information processing device;
   to receive the resultant data concerned with the post-mapping data from the first information processing device, and
   to construct a speech recognition result by modifying, based on the mapping function used, the resultant data returned from the first information processing device into the same result as a result of performing the speech recognition without using the mapping function at the second information processing device;
wherein:
the second information processing device is operable in response to speech data and comprises at least an acoustic likelihood computation unit;
the second information processing device is configured to:
   map phoneme ID strings indicating pronunciations of respective words included in a language model by using the mapping function given by the second information processing device, and delete at least information on representation character strings of the respective words included in the language model;
   compute acoustic likelihoods of all known phonemes or necessary phonemes for each frame of the speech data to generate a sequence of a group of the phoneme IDs and acoustic likelihoods that are mapped by using the mapping function given by the second information processing device; and
   transmit the sequence of the group of the mapped phoneme IDs and acoustic likelihoods and the language model after the mapping to the first information processing device further comprising a hypothesis search unit.

2. A speech recognition system, comprising:
a first information processing device comprising a speech recognition processing unit for receiving data to be used for speech recognition transmitted via a network, carrying out speech recognition processing, and returning resultant data representative of a result of the speech recognition; and
a second information processing device configured:
   to be connected to the first information processing device via the network,
   to perform mapping of pre-mapping data by using a mapping function unknown to the first information processing device to obtain post-mapping data,
   to transmit the post-mapping data to be used for the speech recognition by the speech recognition processing unit to the first information processing device;
   to receive the resultant data concerned with the post-mapping data from the first information processing device, and
   to construct a speech recognition result by modifying, based on the mapping function used, the resultant data returned from the first information processing device into the same result as a result of performing the speech recognition without using the mapping function at the second information processing device;
wherein:
the second information processing device is operable in response to inputting speech data and is configured to:
   divide the speech data into blocks;
   map a time sequence among the divided blocks by using the mapping function given by the second information processing device for inputting speech data;
   transmit the blocks of speech to the first information processing device for performing speech recognition based on the time sequence after the mapping;
   receive any one of a feature vector or a sequence of a group of phoneme IDs and acoustic likelihoods from the first information processing device for performing the speech recognition; and
   restore the time sequence by using an inverse function to the mapping function given by the second information processing device for inputting speech data.

3. A speech recognition request device comprising:
a communication unit connected via a network to a speech recognition device comprising a speech recognition processing unit for receiving data to be used for speech recognition transmitted via the network, carrying out speech recognition processing, and returning resultant data;
an information conversion unit for mapping the data to be used for the speech recognition by the speech recognition processing unit by using a mapping function unknown to the speech recognition device to obtain mapped data which are subjected to the mapping; and a recognition result construction unit which is operable on the basis of the mapping function and which modifies the resultant data returned from the speech recognition device by the use of the mapping function and constructs a speech recognition result by modifying, based on the mapping function used, the resultant data returned from the speech recognition processing unit into the same result as a result of performing the speech recognition without using the mapping function at the recognition result construction unit; and an acoustic likelihood computation unit;

wherein said speech recognition device is configured to:
map phoneme ID strings indicating pronunciations of respective words included in a language model by using the mapping function, and delete at least information on representation character strings of the respective words included in the language model;
compute acoustic likelihoods of all known phonemes or necessary phonemes for each frame of the speech data to generate a sequence of a group of the phoneme IDs and acoustic likelihoods that are mapped by using the mapping function given by the speech recognition device; and
transmit the sequence of the group of the mapped phoneme IDs and acoustic likelihoods and the language model after the mapping to the speech recognition device comprising a hypothesis search unit.

4. A speech recognition request device comprising:

a communication unit connected via a network to a speech recognition device comprising a speech recognition processing unit for receiving data to be used for speech recognition transmitted via the network, carrying out speech recognition processing, and returning resultant data;

an information conversion unit for mapping the data to be used for the speech recognition by the speech recognition processing unit by using a mapping function unknown to the speech recognition device to obtain mapped data which are subjected to the mapping; and a recognition result construction unit which is operable on the basis of the mapping function and which modifies the resultant data returned from the speech recognition device by the use of the mapping function and constructs a speech recognition result by modifying, based on the mapping function used, the resultant data returned from the speech recognition processing unit into the same result as a result of performing the speech recognition without using the mapping function at the recognition result construction unit;

wherein said speech recognition request device is configured to:
divide speech data of a sound to be subjected to the speech recognition into a plurality of blocks;
map a time sequence among the divided blocks by using the mapping function;
transmit the blocks of speech to the speech recognition device based on the time sequence after the mapping; and
receive result data on the speech recognition transmitted from the speech recognition device, and restore the time sequence by using an inverse function to the mapping function.

* * * * *

UNITED STATES PATENT AND TRADEMARK OFFICE
CERTIFICATE OF CORRECTION

PATENT NO. : 9,905,227 B2  
APPLICATION NO. : 15/241233  
DATED : February 27, 2018  
INVENTOR(S) : Kentaro Nagatomo Page 1 of 1

It is certified that error appears in the above-identified patent and that said Letters Patent is hereby corrected as shown below:

In the Specification

Column 1, Background Art, Line 58; Delete "A" and insert --$\Delta$-- therefor

Column 8, Best Mode For Embodying The Invention, Line 44; Delete "A" and insert --$\Delta$-- therefor Column 12, Best Mode For Embodying The Invention, Line 60; Delete "D(v_1, A_{1, j})/2 = Ysum_{i, j}{D(v_i, A_{i, j})} = D(V, Aj)" and insert --D(v_1, A_{1, j})/2 = ¥sum_{i, j}{D(v_i, A_{i, j})} = D(V, Aj)-- therefor Signed and Sealed this  
Second Day of April, 2019

Andrei Iancu  
*Director of the United States Patent and Trademark Office*